Nov. 27, 1934.  A. L. PARKER  1,982,533
COUPLING FOR RUBBER COVERED TUBES
Filed Nov. 14, 1931
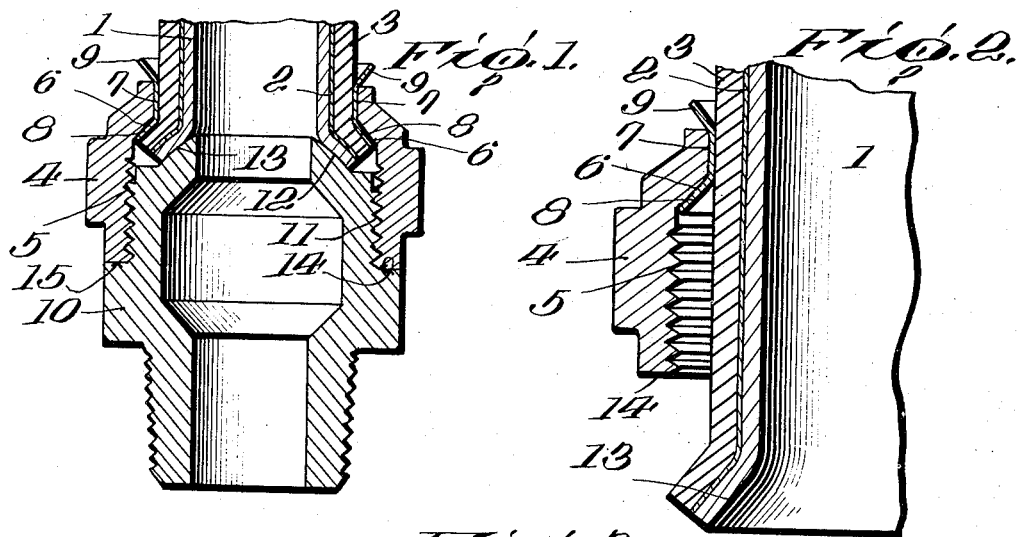
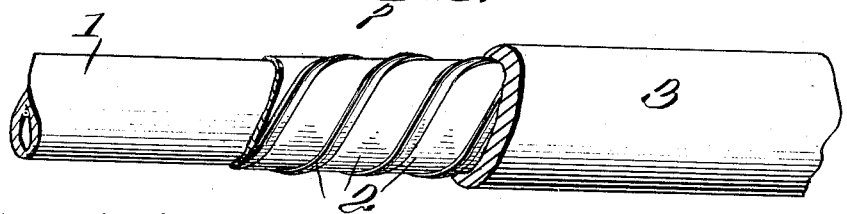
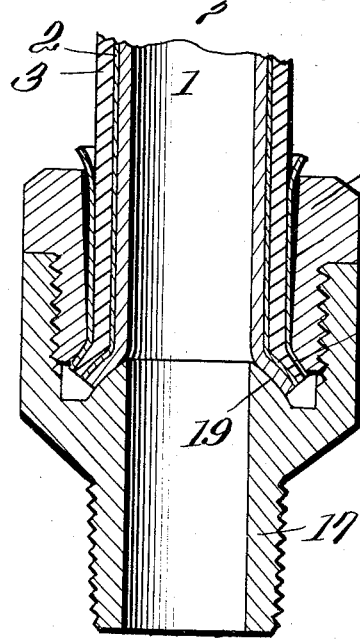
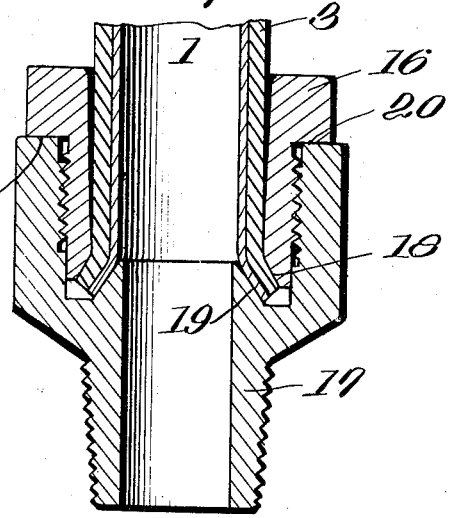
Inventor
Arthur L. Parker
By
Sturtevant, Mason & Porter
Attorneys Patented Nov. 27, 1934

1,982,533

UNITED STATES PATENT OFFICE 1,982,533

COUPLING FOR RUBBER COVERED TUBES

Arthur L. Parker, Cleveland, Ohio

Application November 14, 1931, Serial No. 575,064

2 Claims. (Cl. 285—86)

The invention relates to new and useful improvements in a coupling for a rubber-covered metal tube wherein the rubber covering is firmly attached to the metal tube.

An object of the invention is to provide a coupling for a rubber-covered metal tube wherein the end portion of the metal tube and the rubber covering therefor may be firmly united with the coupling and a very tight joint produced between the rubber-covered tube and the coupling parts.

In the drawing—

Figure 1 is a sectional view showing a coupling with the rubber-covered tube joined to the coupling;

Fig. 2 is a view showing the assembling of the coupling member having the outwardly tapered seat with the ends of the metal tube and the rubber covering flared preparatory to the joining of the same to the coupling members;

Fig. 3 is a side view with parts broken away showing the construction of the preferred form of rubber-covered metal tube;

Fig. 4 is a vertical sectional view through a coupling showing a slightly modified form of coupling, and Fig. 5 is a view similar to Fig. 4, but showing a slightly modified form of rubber-covered tube and attaching means therefor.

The invention is directed to a combination of features which produces a very efficient coupling for attachment to a rubber-covered tube. The rubber-covered tube is preferably formed of an inner metal tube of comparatively light metal which is strong and flexible, a fabric covering which is cemented to the metal tube, and a pre-formed rubber tube covering which contacts with the fabric covering and is cemented thereto. The rubber covering extends all the way to the end of the tube. This rubber-covered tube is joined to a coupling which consists of a member which encircles the rubber-covered tube and has a tapered seat at the end thereof adjacent the end of the tube. This coupling member is threaded into another coupling member which has a tapered seat adapted to extend into the end of the metal tube. In the preferred form of coupling there is a metallic sleeve placed within the coupling member which is to encircle the tube, and this sleeve is tapered so as to conform to a tapered sleeve on the coupling member with which it is associated. The other end of the sleeve may be bent, if desired, so as to retain the sleeve within the coupling member whereby they may be handled as a unit. This coupling member with its associated sleeve is placed on the end of the rubber tube after which the end of the tube is flared to conform to the taper of the seat on the encircling coupling member. The two coupling members are then attached and firmly clamp the flared end of the metal tube, the rubber covering and the sleeve, thus making a very tight joint between the rubber-covered tube and the coupling.

Referring more in detail to the drawing, the rubber-covered tube, in its preferred form, as shown in Fig. 3, consists of an inner metal tube 1 of any suitable light metal which is flexible. Spirally wound on this metal tube 1 is a strip of fabric 2 which is firmly cemented to the metal tube. A pre-formed rubber tube 3 is then placed over the fabric-covered metal tube and cemented thereto. This construction of rubber-covered metal tube forms no part of the present invention, but is shown, described and claimed, together with the method of making the same, in my co-pending application Serial No. 573,679, filed November 7, 1931.

The preferred form of coupling for the rubber tube is shown in Figures 1 and 2. The coupling consists of a female metal member 4 which is provided with a thread 5 and with a tapered seat 6. This female member is adapted to encircle the rubber-covered metal tube 1. Associated with this female coupling member 4 is a metal sleeve or liner 7 of thin tubular stock; either brass, copper or duralumin is preferred. The liner or sleeve 7 is placed in the female coupling member and is flared at 8 so as to conform to the seat 6 before the coupling member is placed over the tube. The outer end of this sleeve or liner 7 may be bent outwardly at 9 so as to join the liner or sleeve to the coupling member as a unit for handling and assembling the parts.

Cooperating with the female member of the coupling is a male member 10 which is provided with a threaded portion 11 and a tapered seat 12. The tapered seat 12 is preferably of a spherical shape. The female member with its associated sleeve is slipped on to the rubber-covered metal tube as indicated in Fig. 2, after which the end of the tube is flared, preferably with a hammer type flaring tool, which serves as a die, thus shaping the flared end of the rubber-covered tube so as to conform to the seats on the coupling member. After the tube end has been flared, then the coupling parts are threaded together and the seat 6 on the female member will firmly engage the outer face of the sleeve or liner 7, while the inner face 13 of the flared end of the metal tube 1 will contact with the seat 12 on the male coupling member. The end 14 of the female coupling member contacts with a shoulder 15 on the male member and limits the threading movement of the female member on to the male member. By this arrangement, the proper compression of the rubber tube at the forward end thereof is attained, and there is no danger of the mechanic forcing the rubber from between the metallic surfaces through excessive turning of the coupling members. Furthermore, the coupling parts are securely locked together so as to resist vibration separating the same. When the flared end of the rubber-covered tube is firmly clamped with a protecting rubber cushion between the clamping seats of the coupling members, a tight joint is maintained and the parts are securely held, even under excessive vibration in the tube parts. The sleeve or liner 7 not only serves as a clamping member, but it reduces the natural friction between the female coupling member 4 and the rubber covering of the tube. This provides metallic surfaces with metallic friction contact during the joining of the coupling members to the tube, rather than a friction between rubber and metal.

In Fig. 4 of the drawing, the coupling member 16 which encircles the tube is the male member and is threaded into the female member 17. The male member has a tapered seat 18 engaging the outer tapered face of the sleeve or liner 7 and the female member 17 has a tapered face 19 engaging the inner face of the flared end of the metal tube 1. The outer end of the liner 7 is bent so as to secure the same to the male coupling member as a unit. The parts are assembled in precisely the manner described above.

In Fig. 5 of the drawing, coupling members are shown similar to those in Fig. 4. In this form of the invention, the metal tube 1 is provided with a rubber covering 3. There is no sleeve or liner used, but the male coupling member 16 has its tapered seam 18 directly in contact with the outer face of the rubber covering for the metal tube. The seat 19 on the female member 17 engages the inner face of the flared end of the metal tube 1. In the coupling shown in Figures 4 and 5, there is a shoulder 20 on the male coupling member 16 which engages the end 21 of the female coupling member and limits the threading movement of one coupling member into the other. The coupling members are so proportioned that the rubber covering is not forced from between the seats, but is firmly clamped between the seats and retained so as to form a tight joint and a cushioned joint for uniting the tube coupling members.

It will be understood that the coupling members may be varied as to construction. It is essential, however, that there shall be tapered seats clamping the flared end of the rubber-covered tube, and that there shall be cooperating stops which limit the turning of the coupling members when they are threaded together. It will also be obvious that other forms of rubber-covered metal tubes may be used and efficiently joined to my improved coupling.

Having thus described the invention, what I claim as new and desire to secure by Letters-Patent, is—

1. The combination of a metal inner tube, a rubber covering therefor firmly joined thereto and extending throughout the length of the tube, said tube and rubber covering having the end thereof flared outwardly, a metal coupling member having a tapered seat extending within and bearing on the tapered end of the inner tube, a metal coupling member surrounding the rubber tube and having a tapered seat adapted to exert a pressure against the outer surface of the flared end of the rubber covering for the metal tube, said coupling members having a threaded connection whereby the flared end of the rubber covered metal tube is clamped between the seats on the coupling members, and means for limiting further movement of the threaded engagement when the flared end of the rubber covered metal tube is firmly clamped.

2. The combination of a metal inner tube, a rubber covering therefor firmly joined thereto and extending throughout the length of the tube, said tube and rubber covering having the end thereof flared outwardly, a metal sleeve surrounding the rubber covered metal tube at the end thereof and having the outer end thereof flared outwardly to conform to the flared end of the tube, a metal coupling member having a tapered seat extending within and bearing on the tapered end of the metal inner tube, a metal coupling member surrounding the metal sleeve and having a tapered seat bearing on the outer face thereof, said coupling members having a threaded connection whereby the flared end of the rubber covered metal tube is clamped between the seats on the coupling members, and means for limiting further movement of the threaded engagement when the flared end of the rubber covered metal tube is firmly clamped.

ARTHUR L. PARKER.